Figure 1:
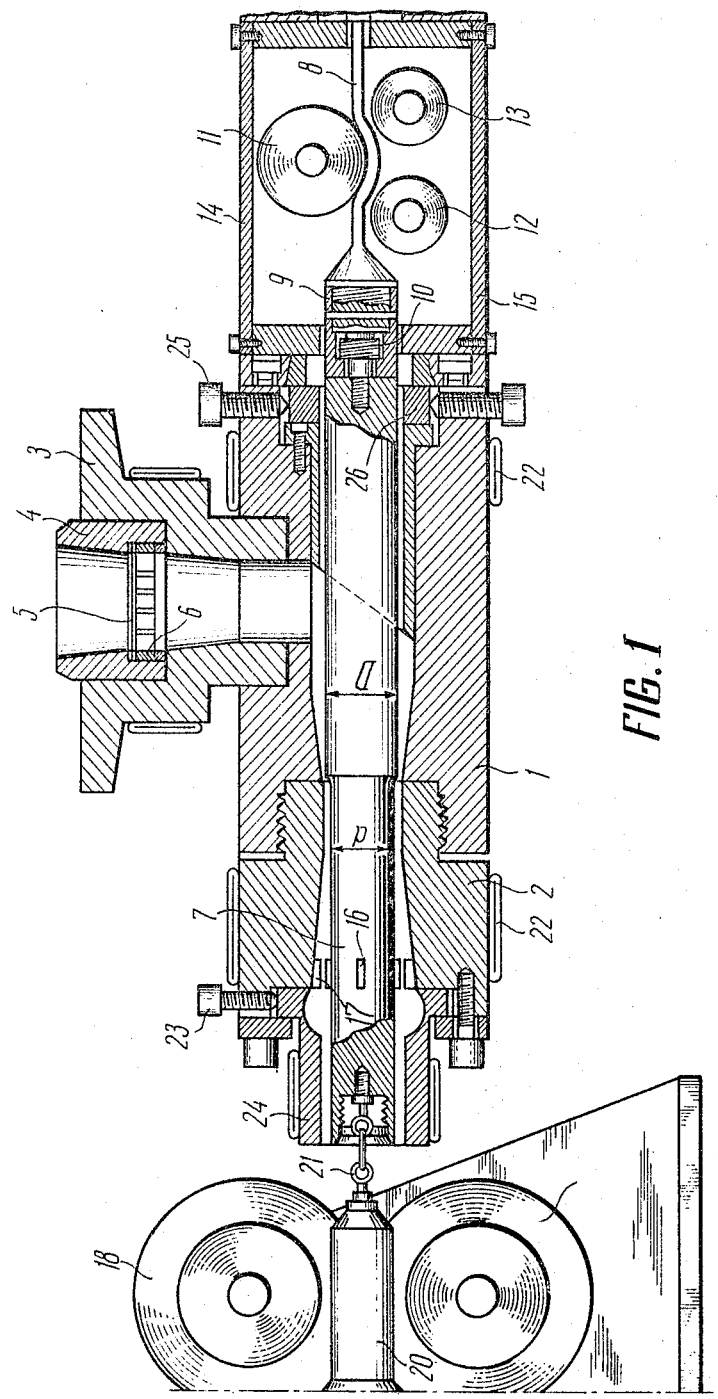

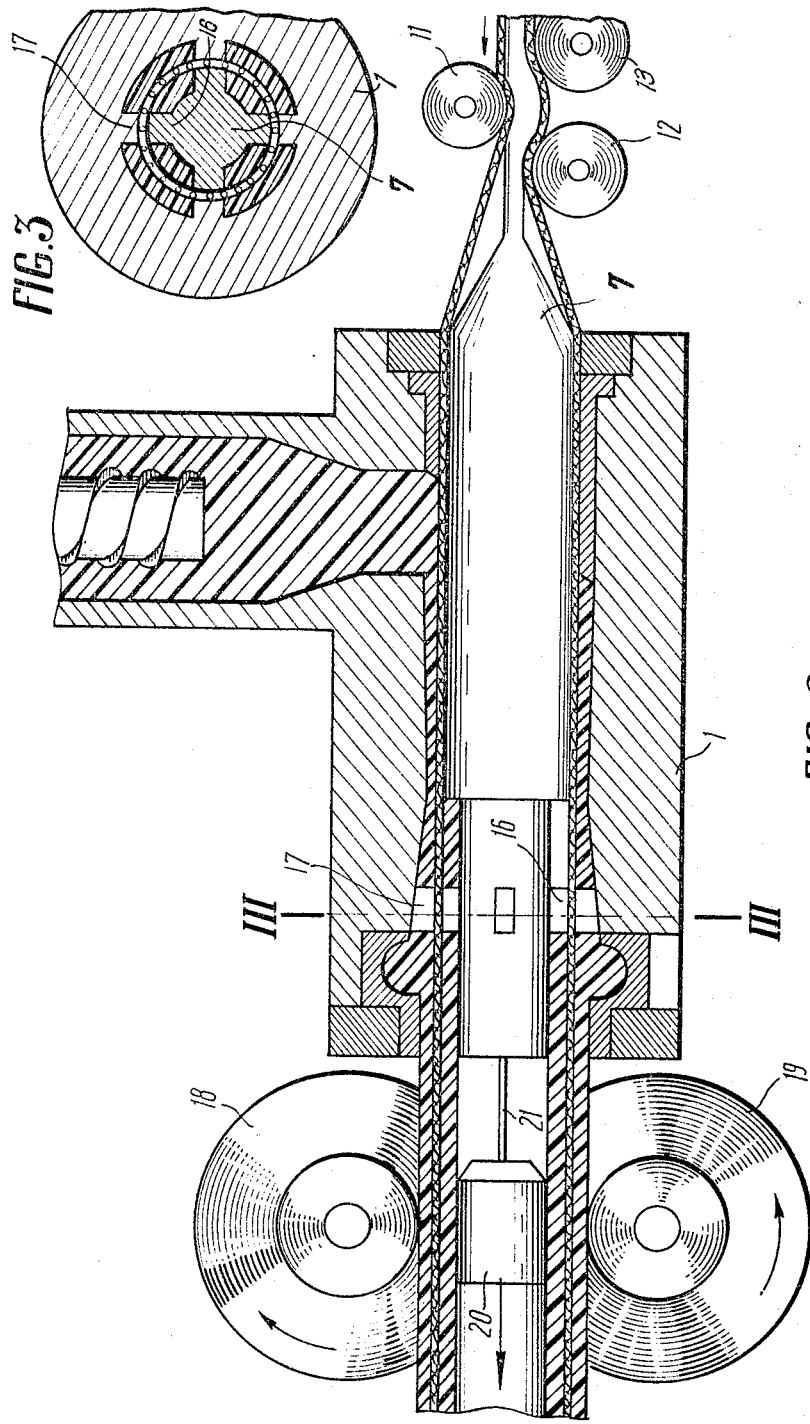

ns patent Office 3,320,635
Patented May 23, 1967

3,320,635
EXTRUSION HEAD
Jakov Julievich Zolotarevsky, Moscow, U.S.S.R., assignor to Gosudarstvenny Nauchno-Issledovatelsky Institute Plasticheskikh Mass, Moscow, U.S.S.R.
Filed Jan. 4, 1965, Ser. No. 423,266
2 Claims. (Cl. 18—13)

The present invention relates to constructions of extrusion heads for the manufacture of reinforced articles, such as tubes, hoses, flexible pipes etc., from thermoplastic materials.

The heretofore known extrusion head for a continuous manufacture of reinforced articles, such as tubes or hoses, from thermoplastic materials comprises a casing; a mandrel mounted inside said casing; a mandrel holder serving for fastening and fixing said mandrel; a molding head rigidly connected with the casing; a swivel chuck, disposed in front of the extrusion head outlet and serving to secure swivel bobbins.

Following is the process of manufacturing tubes and hoses, using the knwn extrusion head.

Molten thermoplastic materials are fed, with the help of the extruder screw, through the openings in the mandrel holder, and into the zone wherein the process of reinforcing a tube is being performed. In this zone reinforcement fiber unwound from the bobbins is wound onto the mandrel; each newly formed coil is pushed off the mandrel under the pressure of the molten thermoplastic material, thus forming a reinforced thermoplastic tube (hose) on leaving the extrusion head.

The disadvantage of the known extrusion head lies in that it cannot be used for obtaining shaped hollow articles reinforced with a circular-woven hose, as the mandrel is fixed with one of its ends, in the mandrel holder. Besides that, when using the known extrusion head one may only produce reinforced articles of a cylindrical section.

Thermoplastic tubes reinforced with a circular-woven hose are equally strong in both radial and axial directions, which makes it possible to manufacture thin-walled tubes of sufficient strength. Besides that, the use of a hose manufactured of any type of fiber makes it possible to obtain reinforced articles of any desirable section.

The primary object of the present invention is to devise a novel construction of the mandrel, ensuring a continuous manufacture of thermoplastic articles reinforced with a circular-woven or non-woven hose.

In the accomplishment of the above object it appears necessary to work out a novel construction of the extrusion head, that would ensure a continuous passage of a circular-woven or non-woven hose and pressing of the latter with the thermoplastic material in such a way that the reinforcement hose should find itself inside the wall of the article.

The above object has been achieved thanks to a novel construction of the extrusion head, according to which a mandrel is placed inside the extrusion head so that between said mandrel (along its entire length) and the inner surface of the head a clearance is formed, said clearance allowing passage of the reinforcement hose.

To let the reinforcement hose pass freely over the mandrel as well as keep the mandrel in the operating position, the latter is provided with a shaft having a curved portion, that rests on two lower supporting rolls and is slightly pressed from above with a third roll, whose radius corresponds to that of the curvature of said curved portion.

To press on a meshy reinforcement hose inside the wall of the article, the diameter of the mandrel decreases in the direction of the extrusion head outlet in accordance with the configuration of the inner surface of the article. The mandrel has projections which are opposite to projections on the inner surface of the casing, and there is a radial clearance between the projections on the mandrel and those on the casing, sufficient for the passage of the reinforcement hose.

The invention will be further clarified in relation to the accompanying drawings, in which:

FIGURE 1 is a longitudinal sectional view illustrating the extrusion head of the invention, FIGURE 2 is a view similar to FIGURE 1 diagrammatically illustrating the formation of the plastic reinforced hose, and FIGURE 3 is a cross-sectional view taken on lines III—III of FIGURE 2.

The extrusion head comprises casing 1 with a detachable front portion 2. Fixed to the casing is sleeve 3 housing intermediate sleeve 4 with filter screens 5 and grating 6. Sleeve 3 serves for fixing the extrusion head to the extruder.

Housed in casing 1 of the extrusion head is mandrel 7, which is held therein with the help of curved shaft 8 connected to said mandrel through bush 9, by means of screw 10. The curved shaft is held in the extrusion head with the help of rolls 11, 12 and 13. The pins of the rolls are mounted in the walls of a split box fixed to the extrusion head. The split box consists of upper and lower equal portions, 14 and 15 respectively, roll 11 being mounted in the upper portion, and rolls 12 and 13—in the lower one. The two portions are hinged, and, when loose, the lower portion 15 may drop down and the upper portion 14 tilt backwards from the plane of the drawing. In front both portions are locked together.

The diameter of the mandrel is not constant throughout the whole length of the latter, diameter D of the back portion corresponding to the diameter of the reinforcement, whereas diameter d of the front portion is somewhat smaller than the inner diameter of a tube or hose.

At a certain distance from the front end of the extrusion head there are provided projections 16 and 17 on mandrel 7 and on the front portion 2 of the casing, respectively, forming a clearance through which a reinforcement hose H, FIGS. 2 and 3, passes.

Curved shaft 8 provides for an exact matching of projections 16 and 17 holding them opposite to each other, molten thermoplastic materials such as at P passing between said projections, see FIGURE 3.

To ensure better intermixing of the molten thermoplastics, projections 16 and 17 may be made at an angle to the axis of the extrusion head.

Upon leaving the extrusion head the hose or tube is passed through grooved pressing rolls 18 and 19 and inner gage 20 placed between the latter and connected with the end of mandrel 7 by means of a flexible link, e.g. chain 21.

To heat the extrusion head, provision is made of electric heaters 22. The control of the thickness of walls of hoses and tubes is effected with the help of screws 23 of die 24 and screws 25 of ring 26, the latter shifting the back end of mandrel 7 together with screw 10.

Following is the operational procedure, when using the proposed extrusion head.

The upper 14 and lower 15 portions of the split box are opened, the mandrel is taken therefrom, the end of a reinforcement hose is set on the mandrel and fixed on the front end thereof with the help, for instance, of a screw plug (not shown in the drawing) screwed into the end opening of the mandrel. Next, the mandrel with the hose set thereon is placed in the opening of casing 1 of the extrusion head and fixed in the necessary position by means of rolls 11, 12 and 13. Then the screw plug is unscrewed from the front end of the mandrel, thus releasing the end of the reinforcement hose which is then passed through rolls 18, 19 and inner gage 20. After the above operations and the switching on of electric heaters 22, molten thermoplastic materials are fed to the extrusion head via connecting sleeve 3 under required pressure ensuring a high-quality molding of the tube or hose.

The proposed extrusion head may be used for manufacturing tubes of any length and section, sheets (by cutting a tube along its generatrix on leaving the extrusion head), flexible hoses (for sprinkling), flexible pipes (as intermediate product for subsequent manufacture of bags).

I claim:

1. Apparatus for extruding shaped tubular members of thermoplastic material having a reinforcing sleeve embedded in such thermoplastic material comprising a casing means having a longitudinal bore, a mandrel mounted within said bore in clearance relation with respect to the bore for reception of said sleeve, means detachably securing said mandrel within the bore and holding the same against axial displacement therein, said casing having die means at the end thereof remote from said securing means, superposed grooved drawing rollers mounted in front of said die, a gauge between said rolls for receiving said sleeve whereby movement of the rolls draws said sleeve taut, means for feeding thermoplastic material into said bore to flow over and through said sleeve as the latter is pulled by said rolls whereby the extruded thermoplastic material is likewise pulled through said rolls over said gauge, means connecting said gauge with said mandrel, a portion of said bore having projections thereon extending toward said mandrel and said mandrel having projections thereon adapted to underlie said first-mentioned projections, the length of said respective projections being such as to provide a clearance space between the projections for accommodating said sleeve whereby said projections space said sleeve from said mandrel to ensure the proper positioning of the sleeve within said thermoplastic material being extruded thereover.

2. Apparatus as claimed in claim 1 in which the means detachably securing the mandrel within the bore comprise a split box connected to said casing, a shaft having an arcuate portion detachably connected to the mandrel and disposed within said box, rolls carried by said split box and engaging said shaft on opposite sides thereof on each end of the curved portion and within the curved portion so as to lock said mandrel against axial displacement whereby with the split box disassembled the reinforcing sleeve can be passed over said shaft and mandrel, the box thereafter being assembled with the mandrel positioned within the bore and said sleeve passing in the clearance space between the projections out of said die and over said gauge for cooperation with said rolls so that during subsequent extrusion cooperation between said rolls and gauge draws the extruded reinforced thermoplastic tube out of the die while holding said sleeve in taut condition.

References Cited by the Examiner

UNITED STATES PATENTS

| 2,708,772 | 5/1955 | Moncrieff | 18—14 XR |
| 2,767,431 | 10/1956 | DeLambarede | 18—14 XR |
| 2,874,411 | 2/1959 | Berguist. | |
| 2,903,743 | 9/1959 | Lysobey | 18—14 XR |
| 3,045,281 | 7/1962 | Skobel. | |
| 3,159,877 | 12/1964 | Orsini | 18—14 XR |
| 3,188,690 | 6/1965 | Zieg | 18—14 |
| 3,191,230 | 6/1965 | Ashton | 18—13 |

FOREIGN PATENTS

| 694,378 | 9/1964 | Canada. |
| 428,421 | 5/1955 | Great Britain. |

WILLIAM J. STEPHENSON, *Primary Examiner.*